Dec. 29, 1959 D. RUSH 2,919,100

CHARGE PREWEIGHING DEVICE

Filed Dec. 11, 1956 4 Sheets-Sheet 1

INVENTOR.
DALLAS RUSH.
BY
Ward, Neal, Haselton, Orme & McElhannon
ATTORNEYS.

CHARGE PREWEIGHING DEVICE

Filed Dec. 11, 1956

4 Sheets-Sheet 2

INVENTOR.

DALLAS RUSH.

BY

Ward, Neal, Haselton, Orme & McElhannon

ATTORNEYS.

Dec. 29, 1959

D. RUSH 2,919,100

CHARGE PREWEIGHING DEVICE

Filed Dec. 11, 1956

4 Sheets-Sheet 3

INVENTOR.
DALLAS RUSH.
BY
Ward, Neal, Haselton, Orme & McElhannon
ATTORNEYS.

Dec. 29, 1959 D. RUSH 2,919,100

CHARGE PREWEIGHING DEVICE

Filed Dec. 11, 1956 4 Sheets-Sheet 4

INVENTOR.
DALLAS RUSH.
BY
Ward, Neal, Haselton, Orme & McElhannon
ATTORNEYS.

2,919,100

CHARGE PREWEIGHING DEVICE

Dallas Rush, Humboldt, Tenn., assignor to Federal Chemical Company, Louisville, Ky., a corporation of Kentucky Application December 11, 1956, Serial No. 627,669

1 Claim. (Cl. 249—32)

This invention relates to apparatus for producing a succession of charges of divided material, for example, of the granular or pelletized type, for filling into containers such as open mouth bags.

One of the objects of the present invention is to produce such succession of charges at high speed and with a high degree of weight accuracy.

The invention in one aspect thereof comprises a scale bucket having two separate compartments, each of which is provided with its separate and respective dump gate means. The scale bucket is supported by weighing means having a single scale beam, the latter supporting the bucket in a well known manner at one end thereof. Feeder means are provided for the scale bucket comprising means for directing a continuous stream of material thereto, such stream being guided to one or the other of the two separate compartments by stream guide means which are suitably positioned for this purpose. Located beneath the scale bucket is a dump receiving hopper having an outlet which may be in the form of a tube comprising a bag filling tube over which the open mouth of an open mouth bag can be fitted. Automatic control means in turn are provided which are operatively interconnected to both the dump gate means and to the stream guide means. Such control means, responsive to weighing movement of the scale beam, moves the stream guide means to divert the stream of material from the charged to the uncharged scale bucket compartment, and actuates the dump gate means of the charged compartment, thereby to dump same into the hopper.

Thus the novel apparatus comprises a preweighing scale which may be employed for filling containers, such as open mouth bags, the preweighing scale including a scale bucket having two separate compartments, which bucket is supported by a single scale beam, there being a continuous feed to the scale bucket under the control of a stream guide means which directs the continuous feed into one of the two compartments until the scale beam undergoes weighing movement whereupon the stream guide means is shifted to divert the flow to the other compartment, the contents of the charged compartment being immediately dumped.

The above and further objects and novel features will more clearly appear from the detailed description given below when the same is read in connection with the accompanying drawings. It is to be expressly understood, however, that the drawings are for purposes of illustration only and are not intended as a definition of the limits of the invention, reference for this latter purpose being had to the appended claim.

Figure 7:
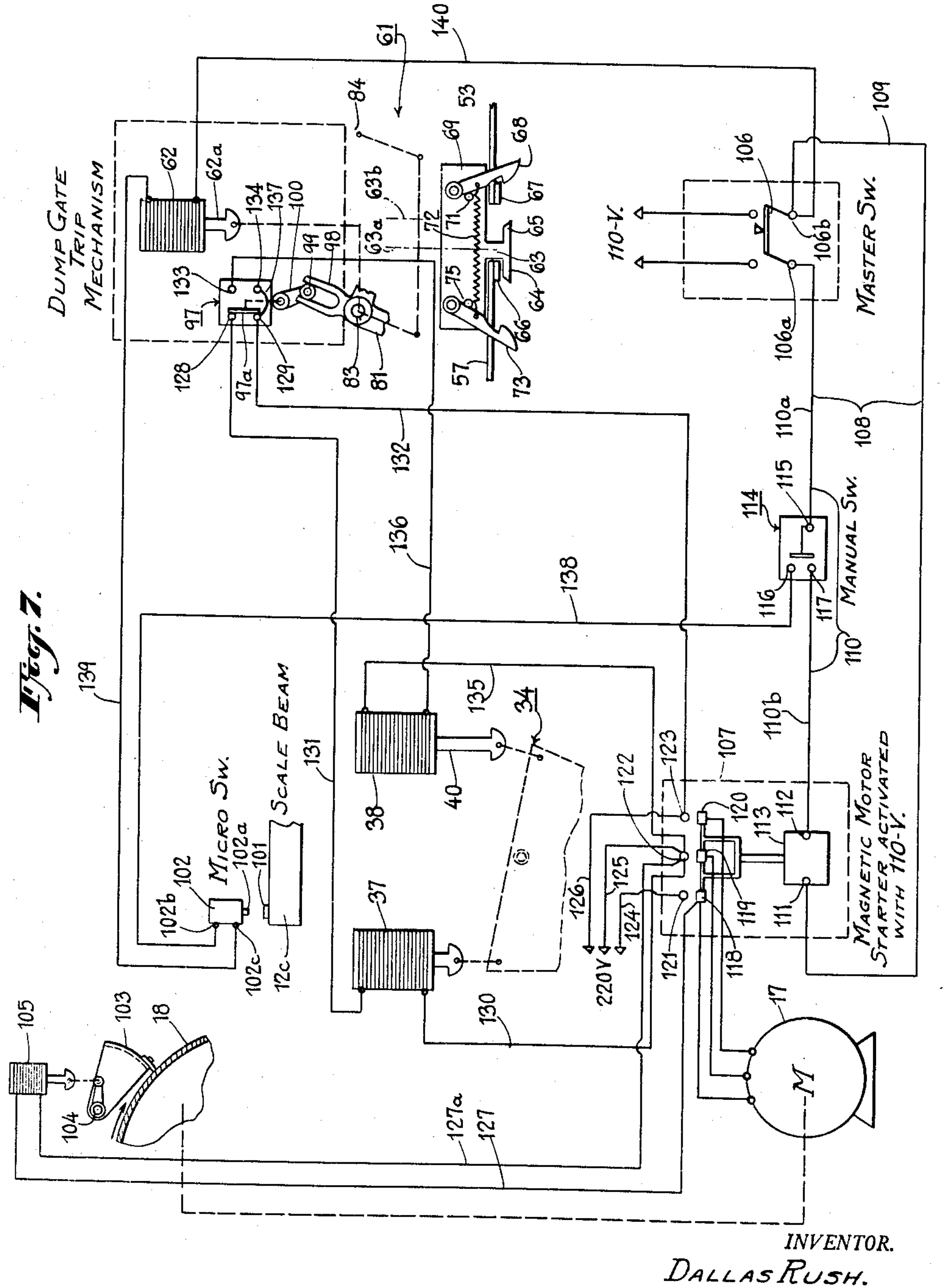

Fig. 7 comprises a schematic view of one form of wiring diagram for operatively interconnecting the several elements of the invention.

Referring to the drawings in greater detail, with particular reference to Figs. 1–4, the novel apparatus comprises feeder means 10 for continuously feeding a stream of material, for example, of the pelletized or granular variety, to a scale bucket 11 which is subdivided into two separate compartments 11*a* and 11*b*. Such scale bucket 11 is supported by weighing means 12 having a single scale beam, and such scale bucket is positioned above a dump receiving hopper 13 which is thus positioned for receiving the charges as dumped from either one of the aforementioned compartments 11*a* or 11*b*.

Figures 2, 3, 4:
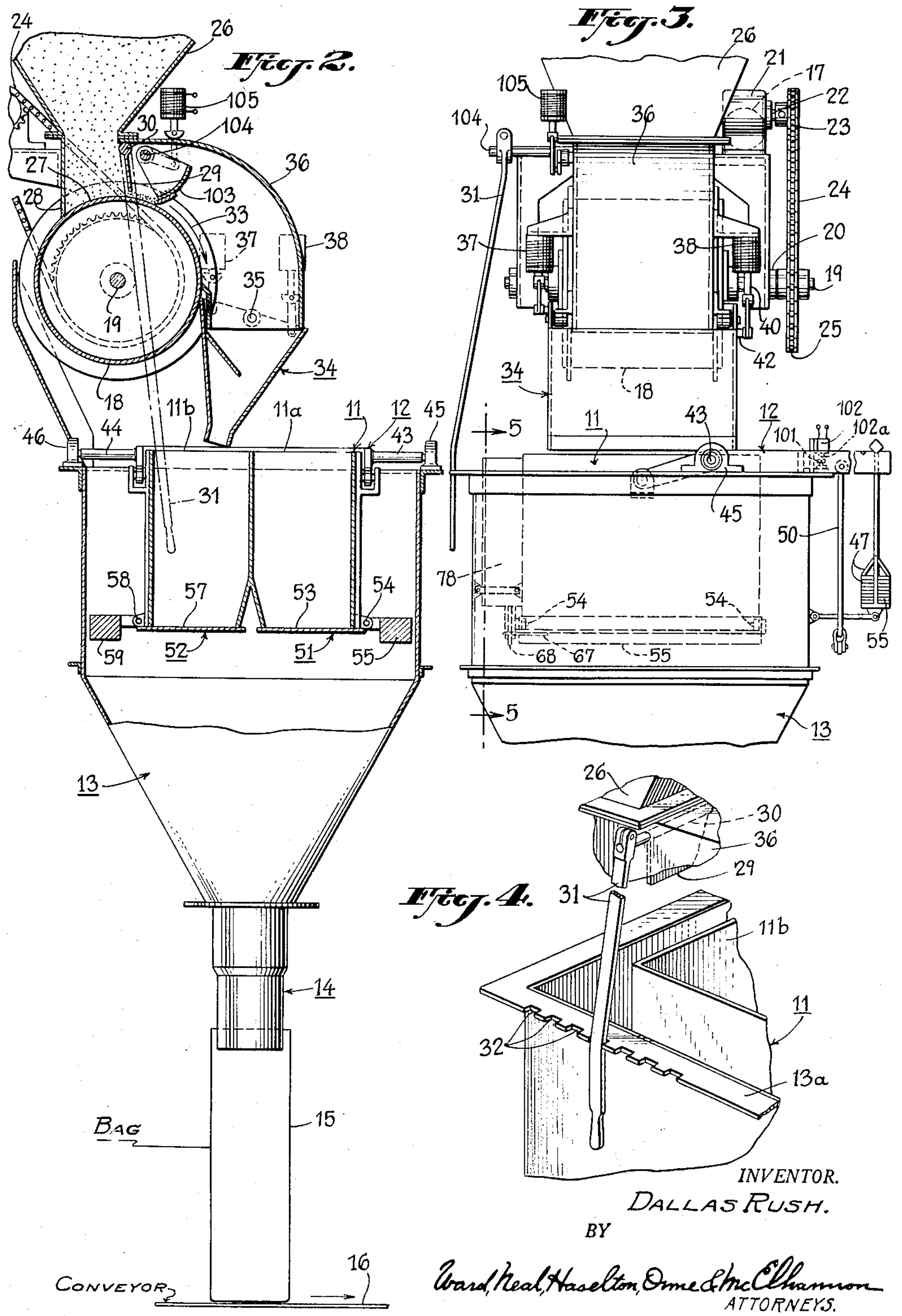
Fig. 2 is a vertical sectional view taken substantially along line 2—2 of Fig. 1, such vertical sectional view being transverse of the axis of the scale beam.
Fig. 3 is a side elevation, partly in section and with parts broken away, of the apparatus shown in Fig. 1.
Fig. 4 is a perspective fragmentary view, on a somewhat enlarged scale, of a portion of the apparatus shown in the previous figures for controlling a flow of granular material to the apparatus.

The dump receiving hopper 13 in turn is provided with an outlet 14 which, in the form shown, may be a bag filling tube for open mouth bags, such a bag 15 being shown in filling relation to the tube (Fig. 2). The term "open mouth bag" as employed herein is used in contradistinction to a valve bag and, of course, refers to a bag having a large and wide open mouth across the top thereof and is well shown in Fig. 2.

The open mouth bag 15, in the form shown, is positioned above a moving conveyor 16 which preferably is moving at all times. The bag 15 may be held by hand in filling relation with the tube 14 in such an attitude that the bottom is lifted slightly above the conveyor 16 while the charge is being dropped. After the charge is dropped, the operator who holds the bag in filling relationship with the tube may move the top edge of the bag downward and out of engagement with the lower extremity of the filling tube thereby to lower the bag upon the conveyor 16 to permit the latter to remove the bag, for example, to a bag closing machine.

Figure 1:
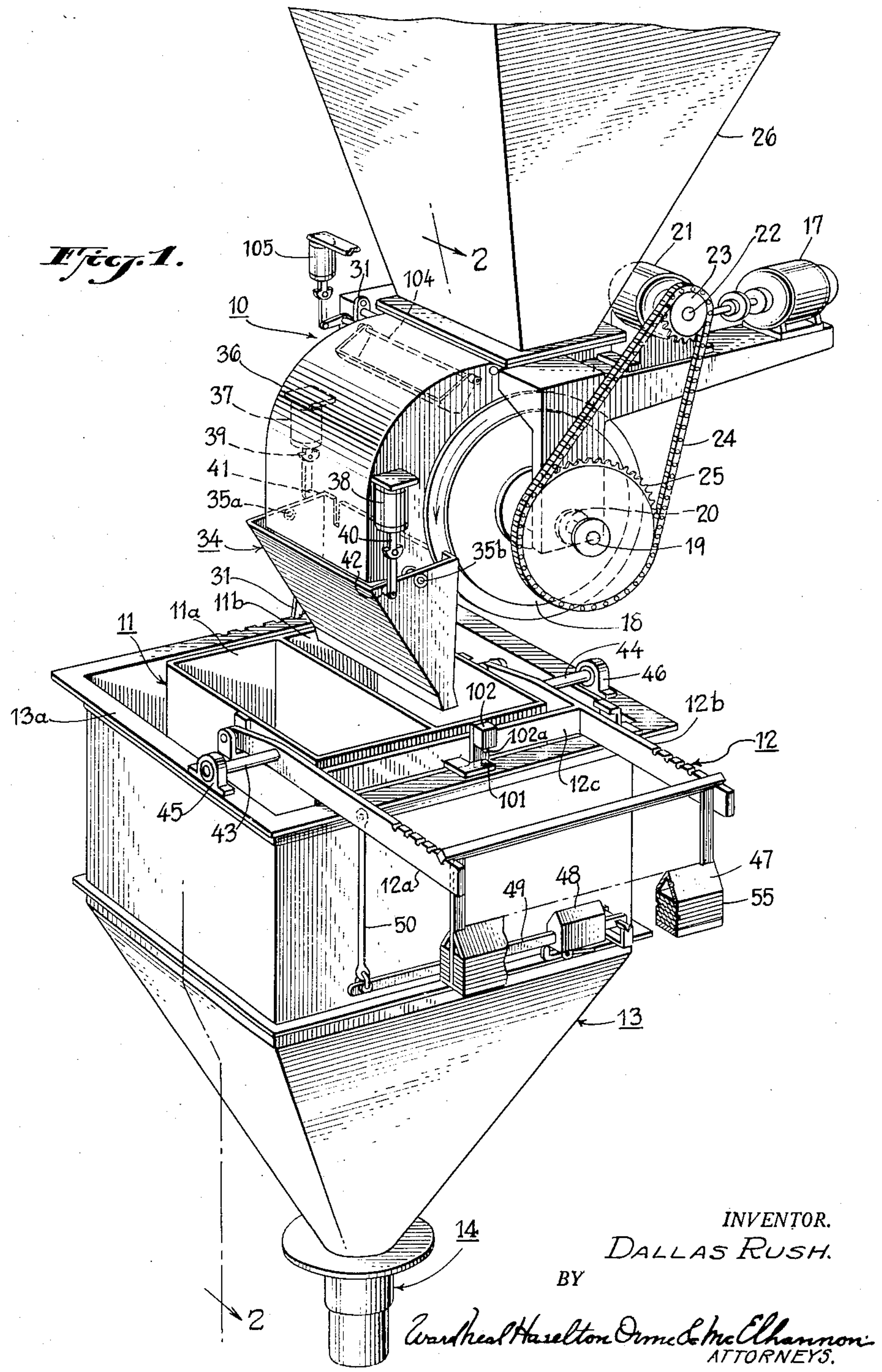
Fig. 1 is a perspective view, partly in section and with parts broken away, of one form of apparatus embodying the present invention.

Reverting to Fig. 1, the feeder means 10 comprises means for continuously feeding a stream of material to the scale bucket 11, such means including a feeder motor 17 which is operatively connected to a feeder drum 18 which is mounted for rotation upon a horizontal axis by means of a horizontal supporting shaft 19 journaled in suitable bearings, such as 20 (Fig. 1). The feeder drum 18 is continually driven by the motor 17 by means of a suitable operative interconnection between such motor and the shaft 19, for example, by means of a reduction gear 21 which is driven by the motor 17, such reduction gear having an output shaft 22 upon which is secured a sprocket wheel 23 about which engages a sprocket chain 24, the latter in turn engaging another sprocket wheel 25 and which in turn is secured to or keyed to the feeder drum shaft 19.

As is well shown in Fig. 2, the feeder drum 18 is positioned beneath a main supply hopper 26 having a mouth 27 which is in close proximity to the feeder drum 18. The mouth 27 of the main hopper 26 is defined by an elongated tube 28 of rectangular cross-section, the lower edges of which are positioned in close proximity to the upper surface of the cylindrical feeder drum 18.

The amount of granular material that is permitted to flow from the main hopper 26 is under the control of a gate 29, sometimes referred to as a stripper gate, which comprises a portion of the tube 28 and which is adapted for angular movement about a hinge or pivot 30. Such gate preferably is controlled by a handle or hand lever 31 (Figs. 2, 3 and 4), which can be fixed in angular position in any one of a plurality of notches 32 (Fig. 4).

It will be seen that the motor 17 drives the cylindrical feeder drum 18 in a counterclockwise direction, as viewed in Fig. 1, but in a clockwise direction as viewed on the opposite side, namely, in Fig. 2. Such rotation of feeder drum 18 causes the latter to entrain and to move a stream of granular material beneath the gate 29 in the direction of the arrow 33 and thence downwardly toward the double compartmented scale bucket 11.

Such continuous stream of granular material is directed into either one or the other of the compartments 11*a* or 11*b* of the scale bucket 11 by means of a diverter or stream guide means 34 which is in the form of a funnel-like sleeve. The stream guide means 34 or diverter is of downwardly tapered transverse cross-section, as is well shown in Fig. 2. Furthermore, such stream guide means is mounted for angular movement about a horizontal axis 35, the latter, of course, being the axis of suitable pivot shafts 35*a*, 35*b* for the stream guide means 34, such shafts supporting this element at the outlet of an arcuate conduit 36 which is in the form of an inverted arcuate trough defining a channel between the mouth of the main hopper 26 and the inlet or top region of the stream guide means or diverter 34.

The angular position of such diverter 34 is determined by means of a pair of solenoids 37 and 38 respectively having axially shiftable plungers 39 and 40 which are suitably operatively connected to the diverter 34 preferably on opposite sides of the axis 35. That is, as viewed in Fig. 1, the plunger 39 is pivotally connected to the stream guide means 34 at a point 41 which is near the upper rear edge thereof, and the plunger 40, on the other hand, is connected to such guide means at a point 42 which is near the upper forward edge thereof and thus on the opposite side of such axis 35 as aforementioned.

For the purpose of reducing the need for frequent weight adjustments of the apparatus and also for the purpose of greatly enhancing the speed of operation thereof, the double compartmented scale bucket 11, as aforementioned, is supported upon the single scale beam 12, the latter, in the form shown, comprising an integral frame of H-like conformation having parallel legs 12*a*, 12*b*, a cross-piece 12*c* integral therewith, and suitable trunnions 43 and 44. Such trunnions in turn are journaled in suitable bearings 45 and 46 which are in turn supported upon suitable rigid supporting means which, in the form shown, comprises the upper edge 13*a* of the aforementioned dump receiving hopper 13. Thus the scale bucket 11 is embraced or surrounded by the upper portion of such dump receiving hopper and is, of course, spaced therefrom, there being ample spacing for easy movement of the parts of the scale bucket as will appear more fully hereinafter. It is, of course, understood that the dump receiving hopper 13 is rigidly supported by suitable means (not shown).

Although the trunnions 43 and 44 are supported in bearings above described, it is, of course, understood that suitable knife edges may be employed of a conventional variety if such is desired. Also the scale bucket per se may be supported upon the parallel arms 12*a* and 12*b* by a suitable knife edge arrangement, if desired, or suitable trunnions and bearings may be employed.

The weighing means 12 is provided with a primary counterweight 47 which may be positioned adjustably upon the scale beam in a well known manner, and is also provided with a secondary or fine adjustment weight 48 which is axially shiftable upon an arm 49 in a well known manner, such arm being connected to the scale beam 12, as by a link 50.

Figures 5, 6:
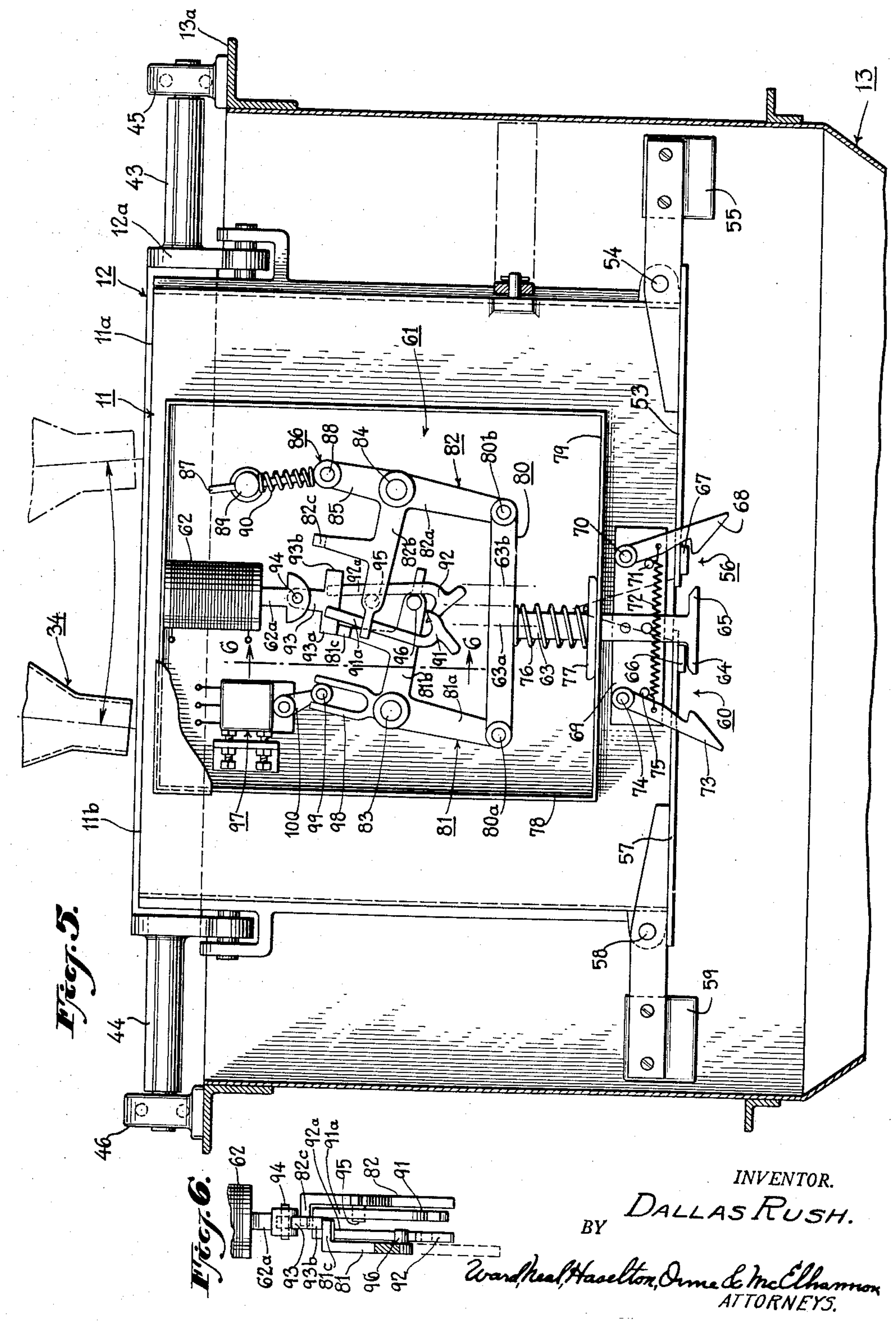
Fig. 5 is a sectional view on an enlarged scale taken substantially along line 5—5 of Fig. 3 and showing in detail a dump control device for the double compartmented scale bucket.
Fig. 6 is a sectional view taken substantially along line 6—6 of Fig. 5.

Referring particularly to Figs. 2 and 5, it will be seen that the two separate scale bucket compartments 11*a* and 11*b* are each provided with its own separate dump gate means 51 and 52, such former dump gate means embracing a dump gate 53, pivoted at 54 upon compartment 11*a*, there being provided a counterweight 55 for causing the gate to swing shut under the influence of gravity after the latch means therefor (to appear below) have been released for dumping the contents of the compartment 12. Latch means for compartment 11*a* are generally designated 56 (Fig. 5).

Referring to the dump gate means 52, the latter embraces a dump gate 57 (Fig. 2) pivoted at 58 to compartment 11*b*, provided with a counterweight 59, and further provided with latch means 60 (Fig. 5).

Referring particularly to Fig. 5, the latch means 56 and 60 will now be described together with escapement mechanism generally designated 61 for controlling such latch means. It is, of course, desired to be able to dump the contents of one of the compartments 11*a* or 11*b* when it has received a full charge, as evidenced by weighing movement of the scale beam, and at the same time to hold closed the other dump gate. Nevertheless, means should be provided for permitting the dump gate, which has been opened, to swing shut promptly and automatically preferably under the influence of gravity. After such gate has swung shut, it, of course, must be held in such condition until again released.

One form of mechanism for accomplishing the above which has been found successful is shown in Fig. 5 and is described broadly as follows:

An electrically operable solenoid 62 is operatively connected to the aforementioned escapement mechanism 61 for controlling the latch means 56 and 60 in such a manner that one of the dump gates can be suddenly opened or dumped and its respective latch means prepared for receiving and locking shut same after it has swung shut under the influence of the dump gate counterweight while at the same time holding shut the other dump gate. The next successive energization of the solenoid 62 by means of the mechanism broadly mentioned above is adapted for releasing the next or other dump gate and in turn preparing its respective latch means to receive and hold shut its dump gate after the contents have been dumped and the gate has swung shut under the influence of gravity while at the same time insuring that the first-mentioned dump gate is held closed while it is receiving the next charge to be weighed.

To this end, there is provided a dump finger post 63 which, while in a vertical position, can be shifted from left to right, that is, from the position shown in Fig. 5 on a center line 63*a* to the left so that it assumes a position on a center line 63*b*. At the lower extremity of the dump finger post 63 there are provided respectively a left dump finger 64 and a right dump finger 65 which extend respectively to the left and right of the center line of the dump finger post 63 and which are respectively adapted for insertion beneath left and right dump gate latch fingers 66 and 67, respectively. Thus in the position shown the left dump finger 64 is positioned beneath the left dump gate latch finger 66 thereby to hold the dump gate 57 in a closed condition. Obviously, the dump finger post 63 may be shifted while in a vertical attitude to the righthand limit of its motion, that is, so that it is on the center line 63*b* whereupon the dump finger 65 will be beneath the latch finger 67 to hold shut the right dump gate 53.

It will be noted that while the left dump finger 64 is positioned beneath the latch finger 66, as shown in Fig. 5, thereby to hold shut the dump gate 57, the other dump gate 53 is being held in a closed condition by means of a latch hook 68 which engages the right dump gate latch finger 67.

The latch hook 68 in turn is pivotally mounted upon a latch hook plate 69 which is rigidly secured to the dump finger post 63 for lateral movement therewith. The latch hook 68 is mounted for pivotal movement about a pivot 70 and is resiliently urged against a limit-stop 71 by means of a spring 72, such latch hook 68 thus being urged in a clockwise direction.

Analogous latch hook structure is provided for the lefthand dump gate means comprising a latch hook 73 pivoted at 74 and resiliently urged against a limit-stop 75 by means of the same spring 72. It will be noted that the two pivots 70 and 74 and the two limit-stops 71 and 75 respectively for the latch hooks 68 and 73 are symmetrically located relative to the dump finger post 63 and hence when one is in position for locking shut its respective dump gate the other one is spaced away from its operative position and hence is unable to hold closed its respective dump gate, this function being performed by the pertinent finger of the dump finger post 63, that is, either finger 64 or 65. Thus, in the attitude of the parts shown in Fig. 5, the latch hook 68 is holding closed the right dump gate 53 by virtue of its engagement with the dump gate latch finger 67, whereas, on the other hand, the latch hook 73 is spaced away from its dump gate latch finger 66 and the latter is being held thereby to close the pertinent dump gate 57 by means of the left dump finger 64.

It will be seen in Fig. 5 that the dump finger post 63 is urged upwardly by means of a spring 76 which embraces the dump finger post above a slidable washer 77 within a housing 78 and above a floor 79 of such housing. The latter floor 79 is provided with a suitable slot for permitting the aforedescribed lateral movement of post 63, that is, movement from center line **63*a* to 63*b*. Said spring 76 at its upper extremity engages a main cross-link 80. Thus the dump finger post and the elements 64, 65 and 80** are in the shape of a T.

The mechanism for laterally shifting the dump finger post 63 will now be described with further reference to Fig. 5, such mechanism comprising the aforementioned main cross-link 80 to the opposite extremities of which respectively are pivotally connected a pair of bell crank levers 81 and 82. The bell crank levers 81 and 82 respectively are mounted for angular motion about fixed pivots 83 and 84.

Each of the bell crank levers 81 and 82 comprise arms **81*a*, 81*b* and 82*a*, 82*b*, which pairs of arms respectively are perpendicular to one another. The bell crank lever 82 is further provided with an extension 85 which is substantially in alignment with the arm 82*a*, such extension comprising a part of a toggle arrangement generally designated at 86 and comprising a link 87 which is pivoted at 88 to the upper extremity of the extension 85 and which passes through a bore in a pivoted lug 89 and is axially shiftable therein. A toggle spring 90 embraces the link 87 intermediate the pivot 88 and the lug 89, thereby to create a conventional toggle action as a result of angular shifting of the extension arm 85**.

During the operation of the apparatus, as will appear more fully below, the aforementioned solenoid 62 (Fig. 5) is momentarily energized and a plunger **62*a* thereof thus is momentarily drawn upward into the solenoid. It is desired to associate operatively the solenoid 62 with the escapement mechanism 61 in such a way that each time there is an energization thereof the dump finger post 63 is shifted from one extreme position to the other. This is accomplished by means of a pair of escapement hooks 91 and 92 (Figs. 5 and 6) respectively having shafts 91*a* and 92*a* which are rigidly secured to an inverted T member 93 which in turn is pivotally secured by a pivot 94 to the lower extremity of the solenoid plunger 62*a*. The inverted T member 93, as shown in Fig. 5, is provided with left and right arms 93*a* and 93*b***, respectively, the function of which will appear herebelow.

The function of the escapement hook 91 is to engage and pull upwardly a bell crank lug 95 in response to an upward movement of the plunger **62*a*, thereby angularly to shift the bell crank lever 82 and the entire interconnected linkage to the left to the position shown in Fig. 5, it being understood, of course, that such bell crank lug 95 for this purpose initially would be in its lowermost position instead of its uppermost position as shown. The function of the escapement hook 92 is to engage the bell crank lug 96 also in response to an upward movement of the plunger 62*a* and to shift the bell crank lever 81 in a counterclockwise direction thereby to shift the entire quadrilateral linkage (81, 82 and 80) to the right, as viewed in Fig. 5, thereby to shift the dump finger post from the center line 63*a* to 63*b*. It is, of course, understood that the aforementioned engagement of the bell crank lugs 95 and 96 is effected in the manner of an escapement and takes place alternately, that is, upon a first energization of the solenoid 62 and hence a first lifting of the plunger 62*a* one of the lugs 95 or 96 will be so lifted by its respective hook and on the next succeeding energization of the solenoid 62** the other lug will be so lifted and hence the aforementioned quadrilateral linkage will be alternately shifted back and forth.

To the lower extremities of the arms **81*a*, 82*a* is pivotally connected the aforementioned main cross-link 80, the pivotal connection respectively being at 80*a* and 80*b*. Hence a quadrilateral is formed by the four pivots 80*a*, 80*b*, 84 and 83, it being understood, of course, that the pivots 83 and 84 are fixed with respect to the framework of the apparatus, whereas the pivots 80*a* and 80*b* can shift laterally thereby to move the dump finger post 63** in the manner above described.

For the purpose of insuring that the escapement hooks 91 and 92 are respectively positioned properly beneath their bell crank lugs 95 and 96 (Figs. 5 and 6), the arms **93*a* and 93*b* of the inverted T element 93 respectively coact with so-called "kick-over" fingers 81*c* and 82*c* which respectively are integrally secured to the bell crank arms 81*b*, 82*b* in such a manner that the aforementioned escapement action occurs when the solenoid plunger 62*a* drops under the influence of gravity after the energization of its solenoid 62. Thus, in operation, the coaction of said arms 93*a*, 93*b* with the "kick-over" fingers 81*c*, 82*c*** is as follows:

The escapement hook 92 must be angularly shifted in such a manner that it is placed beneath the lug 96 when the latter is in a depressed position, as shown in Fig. 5, this being necessary in order to prepare the linkage for the next energization of the solenoid 62 whereby such hook 92 can engage the lug 96 and angularly shift the quadrilateral linkage in response to the upward pull of the hook thereby to shift the dump finger post 63 from the center line **63*a* over the center line 63*b*. Consequently when the solenoid 62 is deenergized at one point in its operation and the plunger 62*a* thus is dropped, the arm 93*a* will engage the finger 81*c* after the hook has passed around the lug 96, and the coaction of the arm 93*a* and finger 81*c* will cause the hook 92 to pivot about the axis 94 and to shift angularly to the position shown in Fig. 5. An analogous operation of the parts exists with respect to the hook 91 and the lug 95. That is, after the next energization of the solenoid 62 when the parts are in the position shown in Fig. 5, it will be seen that the lug 96 will be pulled upwardly by the hook 92 and the aforementioned shifting of the linkage will occur when the dump finger post 63 shifts from center line 63*a* to 63*b* whereupon the lug 95 will be the one that is in the depressed position and the lug 96 in turn will be in a raised position. Immediately thereafter the solenoid 62 will become deenergized as a result of the opening of microswitch 102 caused by disengagement of the finger 101 and button 102*a* (Figs. 1 and 7) whereupon the plunger 62*a* will fall and the hook 91 will pass around the lug 95, the latter being in its depressed position, this being possible by the pivoting of the element 93 about the axis 94. Immediately thereafter the arm 93*b*** will coact with the "kick-over" finger 82c and cause the hook 91 to move beneath the lug 95 thereby to prepare same for the next escapement action.

The aforementioned solenoid 62 is energized in response to weighing movement of the scale beam 12 and such weighing movement, in addition to actuating the escapement mechanism above described, also is adapted for shifting the position of the stream guide means or diverter 34 from one extreme position to the other, that is, from a position directing the stream of material from one scale bucket compartment to the other one. This may be accomplished in a number of ways and in the form shown the solenoids 37 and 38 for accomplishing this purpose are alternately energized by switch means 97 which will appear in more detail herebelow in connection with Fig. 7. The switch means 97 are actuated by means of the quadrilateral linkage or escapement mechanism 61. For example, a bifurcated member 98 comprises an extension of the arm 81a of the bell crank lever 81 and hence angularly shifts within preselected angular limits with such bell crank lever. The bifurcated member 98 has positioned therebetween a roller 99 secured to the end of a switch arm 100 which in turn actuates the switch 97. Thus each angular shifting of the linkage 61 will move the switch means 97 from one extreme position to the other and hence will shift the stream guide means 34 from one extreme position to the other.

The energization of the solenoid 62 occurs as aforementioned as a result of weighing movement of the scale beam 12, the latter occurring when a charge of preselected weight has been received in one of the scale bucket compartments. Such weighing movement is adapted for causing a finger 101 on scale beam 12 to thrust up against a contact or switch button 102a (Figs. 1 and 7) of a microswitch 102 thereby to close the latter. Switch 102 is in circuit with solenoid 62 as will appear below.

Reverting to Figs. 1 and 2, with particular reference to the latter, I have found it desirable to employ a solenoid actuated cutoff gate 103 which is pivotally mounted at 104 and operated by a solenoid 105, such cutoff gate being operable only when the main feeder 10 is arrested or put out of operation, for example, when the current to the motor 17 is cut off.

Referring now to Fig. 7, one wiring plan for operatively interconnecting the parts will now be described. In initiating the operation of the device, a hand switch 106 is closed for the purpose of providing electrical energy from a relatively low voltage power source to certain selected circuits, such power source being, for example, of 110 volts. The closing of the switch 106 prepares a circuit 108 for energization of a magnetic motor starter 107 for the motor 17. Such circuit 108 is constituted by leads 109 and 110 respectively interconnecting the opposite poles 106b, 106a of the switch 106 to the opposite terminals 111 and 112 of a solenoid 113 of the aforementioned motor starter 107. Interposed in the lead 110 is a manual switch 114 which normally is opened. Hence the closing of the switch 106 will not energize the magnetic motor starter 107 but will merely prepare the circuit 108 for further control by the manual switch 114.

The lead 110 interconnecting the terminals 106a and 112 is divided into two parts, namely, 110a and 110b, the former of which interconnects the terminal 106a with a primary terminal 115 of the switch 114, the latter terminal 115 being a common input terminal for two other terminals thereof, namely, 116 and 117, the latter being interconnected to the terminal 112 by means of the lead 110b.

The manual closing of the switch 114 will thus effect the energization of the magnetic motor starter 107 by energizing the solenoid 113, thereby to cause engagement between three movable contacts 118, 119 and 120, respectively with the fixed power contacts 121, 122 and 123. The three last-mentioned contacts are respectively connected to the three power leads of a three-wire system, namely, leads 124, 125 and 126, respectively. The engaging of the contacts 118, 119 and 120 with the contacts 121, 122 and 123, via suitable electrical leads, energizes the electric motor 17 and thereby causes the rotation of the feeder drum 18. Contemporaneous with the energization of the motor 17, the solenoid 105 is energized by virtue of its interconnection to the power contacts 121 and 122 via leads 127 and 127a. This causes a lifting of the cutoff gate 103 whereby the stream of material is caused to flow from the main hopper 26 down to the scale bucket 11. Lead 127 interconnects contact 118 with one terminal of solenoid 105. Hence, lead 127 is connected to power contact 121 only when the motor starter 107 is energized.

The motor 17 preferably operates on 220 volts with interconnection to a three-wire system, as shown in Fig. 7. The other electrically energized elements preferably operate on 110 volts.

Assume that the stream guide means 34 is in the position shown in Fig. 2, that is, wherein such means is directed toward the scale bucket compartment 11b. Under these conditions the escapement mechanism of Fig. 5 will be in the position shown therein and the switch 97 will similarly be in such position whereby a main switch bar 97a thereof is in its lefthand position, as viewed in Fig. 7, wherein it electrically interconnects contacts 128 and 129 thereby energizing the lefthand solenoid 37 causing the diverter or stream guide means 34 to be tilted to the left, as viewed in Figs. 2 and 7. This occurs by virtue of a completed circuit between power contact 122 and contact 123 via a lead 130, the solenoid 37, a lead 131, the main switch bar 97a and a lead 132.

Since the parts of the escapement device shown in Fig. 7 are in the same position as shown in Fig. 5, the main switch bar 97a of the switch 97 is shown in Fig. 7 interconnecting the contacts 128 and 129. This prepares the circuit of the left solenoid 37 for energization in response to the closing of the magnetic motor starter switch 107. It is, of course, understood that should the parts of the escapement mechanism 61 be in their opposite or alternative position (that is, with the dump finger post on center line 63b instead of 63a) the switch 97 would be in its opposite position and the switch bar 97a would interconnect contacts 133 and 134 thereby preparing for energization the electrical circuit of the righthand solenoid 38. Such electrical circuit for the righthand solenoid comprises a lead 135 interconnecting the power contact 122 with solenoid 38, the solenoid 38, a lead 136 interconnecting such solenoid to the contact 133, the main switch bar 97a, a birdge bar 137, a contact 129, and lead 132.

The escapement solenoid 62 is electrically connected across the contacts 106a, 106b of the master switch 106 by a circuit to be described hereinafter, the aforementioned microswitch 102 being connected in series in such circuit for the purpose of controlling the energization of the escapement solenoid in response to weighing movement of the scale beam 12. Such electrical circuit for the escapement solenoid 62 comprises the following, commencing with the contact 106a: The lead 110a, the manual switch 114, a lead 138 interconnecting contact 116 of the switch 114 to one terminal 102a of the microswitch 102, a lead 139 interconnecting another terminal 102b of said microswitch to one terminal of the escapement solenoid 62, the opposite terminal of such solenoid being electrically connected to the contact 106b by a lead 140.

In operation, assume that the parts are in the position shown in solid lines in the drawings, for example, assume that the escapement mechanism 61 is in the position shown in Fig. 5 and that the stream guide means or diverter 34 is directed to the lefthand scale bucket compartment 11*b* (Fig. 2). Initially the cutoff gate 103 is in its lowered position thereby preventing any flow of material because gravity holds such gate down and in engagement with the periphery of the feeder drum 18. The first step is the closing of the master switch 106 which prepares for energization the circuit 108 of the magnetic motor starter switch 107. The latter circuit 108 is energized by manually closing the switch 114. This completes the circuit 108 and energizes the aforementioned magnetic motor starter switch 107 whereupon the contacts 118, 119 and 120 respectively engage the power contacts 121, 122 and 123 which energizes the motor 17 thereby causing rotation of the feeder drum 18 and simultaneously energizing the solenoid 105 to lift the cutoff gate 103 thereby to permit a flow of the divided material from the main feeder hopper 26 to the scale bucket compartment 11*b* via the stream guide means 34.

Since the switch 97 is in the position shown (Fig. 7), the solenoid 37 is now energized and the solenoid 38 deenergized thereby tilting the stream guide means 34 to the left, as shown in Fig. 2, and hence toward the scale bucket compartment 11*b*.

Accordingly, the stream of material is fed by the feeder drum 18 into the scale bucket compartment 11*b*, the dump gate 57 of which is held shut by the latch means, the parts of which are in the position shown in solid lines in Fig. 5. When a selected weight of material comprising a charge thus has been filled into the compartment 11*b*, the scale beam 12 undergoes weighing movement and the microswitch 102 is actuated as a result of the finger 101 engaging the contact 102*a* which closes the microswitch 102 thereby completing the circuit of the escapement solenoid 62. Thus immediately such escapement solenoid is energized and the plunger 62*a* thereof is drawn upwardly thereby to actuate the escapement mechanism 61. This comes about as a result of the escapement hook 92 being raised to engage the finger 96 of the bell crank lever 81, thereby causing the quadrilateral toggle linkage (81, 82, 80) to shift angularly about the fixed pivots 83, 84 to the opposite angular position wherein the dump finger post 63 is shifted to the center line 63*b* from its former position on center line 63*a*. Such movement of the dump finger post 63 dumps the contents of the scale bucket 13 because the left dump finger 64 is removed from a supporting position beneath the dump gate 57 and hence the latter swings open to dump the contents of such scale bucket 11*b*. Concurrently with such rightward movement of the dump finger post 63, the latch hook plate 69 also shifts to the right and positions the latch hook 73 for latching closed the dump gate 57 when it swings shut under the influence of its counterweight 59. Such rightward movement of the dump finger post 63 also has this effect: The right dump finger 65 is moved beneath the righthand dump gate latch finger 67 and the right latch hook 68 is simultaneously disengaged from such element 67, thereby to prepare the latch means of the righthand scale bucket for an operation analogous to that just described for the lefthand scale bucket compartment.

Immediately after the dumping of the contents of the lefthand scale bucket compartment 11*b*, obviously the scale beam will, under the influence of the weight 47, drop downward to its initial and lowest position. Suitable shock absorbing means, such as a dashpot, may be provided for preventing any shock to the mechanism as a result of such drop.

Simultaneous with the actuation of the escapement mechanism 61, as aforementioned, resulting from the energization of the escapement solenoid 62, the switch 97 is shifted from its lefthand position shown in Fig. 7 to its opposite position wherein the switch bar 97*a* electrically interconnects the contacts 133 and 137 which, of course, completes the circuit of the righthand diverter solenoid 38 energizing same and at the same time breaking the circuit of the other diverter solenoid 37. The result of this is angularly to shift the diverter or stream guide means 34 to its opposite tilted position wherein it directs the oncoming stream of material to the righthand scale bucket compartment 11*a* for a repetition of the cycle heretofore described.

What is claimed is:

In apparatus for producing a succession of charges of material of selected weight, a scale bucket subdivided into two separate compartments; a first dump gate for one of said compartments; a second dump gate for the other of said compartments; such gates each being swingable about a substantially horizontal axis and each being provided with a counterweight positioned to cause same to swing shut after having been released; a common weighing means for supporting said scale bucket, such common means including a single scale beam; stream guide means positioned for directing a continuous stream to said scale bucket, such guide means being constructed and arranged for directing such a stream to one or the other of such compartments; means for moving such stream guide means within selected limits of motion for so directing such stream; and dump gate control means for said pair of dump gates including means for opening either one of said gates while holding closed the other one and including: a dump finger post, such post mounting at the lower extremity thereof two oppositely extending dump fingers, one for latching each of such two dump gates, means for mounting said dump finger post in a substantially vertical position and for lateral movement between selected limits in a substantially horizontal direction whereby said dump fingers are capable of latching one or the other of said dump gates, a latch hook for said first dump gate; a second latch hook for said second dump gate; means for operatively connecting said latch hooks and said dump fingers whereby in one position of such dump finger post at one extremity of its lateral motion one of the dump gates is held closed thereby while the latch hook which normally closes same is temporarily held inoperative, said other dump finger being free of a latching function with respect to the other dump gate, the second latch hook then being in position for holding the latter dump gate closed, and mean for laterally shifting said dump finger post from one such limit of its motion to the other thereby to release one dump gate and to lock shut the other in timed relationship with the aforementioned motion of said stream guide means.

References Cited in the file of this patent

UNITED STATES PATENTS

| | | |
|---|---|---|
| 895,160 | Carter | Aug. 4, 1908 |
| 941,725 | Neureuther | Nov. 30, 1909 |
| 1,291,707 | Allen | Jan. 21, 1919 |
| 1,562,667 | Van Deren | Nov. 24, 1925 |
| 1,571,460 | Van Deren | Feb. 2, 1926 |